(12) United States Patent
Nayfeh (10) Patent No.: US 9,862,885 B2
(45) Date of Patent: Jan. 9, 2018

(54) HYBRID NANOPHOSPHORS AND UV OR NEAR UV-DRIVEN WHITE LIGHT EMITTING DIODE

(71) Applicant: Munir H. Nayfeh, Urbana, IL (US)

(72) Inventor: Munir H. Nayfeh, Urbana, IL (US)

( * ) Notice: Subject to any disclaimer, the term of this patent is extended or adjusted under 35 U.S.C. 154(b) by 0 days.

(21) Appl. No.: 14/500,253

(22) Filed: Sep. 29, 2014

(65) Prior Publication Data

US 2015/0159819 A1    Jun. 11, 2015

Related U.S. Application Data

(60) Provisional application No. 61/883,496, filed on Sep. 27, 2013.

(51) Int. Cl.

| | |
|---|---|
| *C09K 11/02* | (2006.01) |
| *C09K 11/59* | (2006.01) |
| *C09K 11/88* | (2006.01) |
| *F21V 9/08* | (2006.01) |
| *F21V 99/00* | (2006.01) |
| *C09K 11/58* | (2006.01) |
| *C09K 11/64* | (2006.01) |

(52) U.S. Cl.
CPC .......... *C09K 11/883* (2013.01); *C09K 11/025* (2013.01); *C09K 11/584* (2013.01); *C09K 11/59* (2013.01); *C09K 11/642* (2013.01); *Y02B 20/181* (2013.01)

(58) Field of Classification Search
CPC ....... C09K 11/02; C09K 11/876; C09K 11/59; H01L 33/504
See application file for complete search history.

(56) References Cited

U.S. PATENT DOCUMENTS

| | | | | |
|---|---|---|---|---|
| 3,595,804 A | * | 7/1971 | Martin | C09K 11/642 252/301.6 S |
| 3,960,756 A | * | 6/1976 | Noakes | G01T 1/202 250/367 |
| 5,277,841 A | * | 1/1994 | Jeong | C09K 11/025 252/301.4 F |
| 7,001,578 B2 | | 2/2006 | Nayfeh et al. | |
| 7,279,832 B2 | * | 10/2007 | Thurk | C09K 11/02 313/502 |
| 8,143,079 B2 | | 3/2012 | Scianna et al. | |
| 2010/0141172 A1 | * | 6/2010 | Uchida | F21K 9/00 315/294 |
| 2011/0260192 A1 | * | 10/2011 | Kwak | H01L 33/56 257/98 |
| 2012/0182714 A1 | * | 7/2012 | Kwon | G02B 5/02 362/84 |

OTHER PUBLICATIONS

Cho, Jaehee, et al., "Study of UV excited white light-emitting diodes for optimization of luminous efficiency and color rendering index", phys. stat. sol. (RRL), vol. 3, Issue 1, (Jan. 2009), pp. 34-36.
Song, Hongjoo, et al., "Red light emitting solid state hybrid quantum dot—near-UV GaN LED devices", Nanotechnology, vol. 18, No. 25, May 29, 2007, (4 pages).

\* cited by examiner

*Primary Examiner* — Carol M Koslow
(74) *Attorney, Agent, or Firm* — Greer, Burns & Crain, Ltd.; Steven P. Fallon (57) ABSTRACT

A hybrid nanophosphor includes red silicon nanoparticles in a homogenous mixture blue and green phosphors. A preferred hybrid nanophosphor uses ZnS: Ag, and ZnS: Cu, Au, Al for blue and green conversion, respectively, and mono dispersed 3 nm Si nano particles as a red phosphor. Wide emission profiles are provided by all components, and predetermined color characteristics in terms of CCT and CRI can be achieved simultaneously for excitation. A preferred lighting device includes a nanophosphor thin film of the invention on a UV or near UV-LED.

2 Claims, 12 Drawing Sheets

HYBRID NANOPHOSPHORS AND UV OR NEAR UV-DRIVEN WHITE LIGHT EMITTING DIODE

PRIORITY CLAIM AND REFERENCE TO RELATED APPLICATION

The application claims priority under 35 U.S.C. §119 from prior provisional application Ser. No. 61/883,496, which was filed Sep. 27, 2013.

STATEMENT OF GOVERNMENT INTEREST

This invention was made with government support under ATM 08-02-499 awarded by the National Science Foundation. The government has certain rights in the invention.

FIELD

A field of the invention is phosphors. An example application is to solid state white lighting.

BACKGROUND

Solid state lighting remains an elusive goal, because the broad spectrum quality white light is not provided. Research into solid state lighting has been conducted since the introduction of the first commercial light emitting diodes (LED) in the 1960s. Initial systems lacked a blue component, and blue emitting LEDs were developed much later. Since the introduction of the blue LED, there have been many proposed systems to produce white light from LED sources.

Example systems are the blue LED-pumped systems. These systems do not use a blue phosphor component. The blue component of the white light is thus provided directly from the pumping LED. A recent advancement in such systems is provided by Scianna et al, U.S. Pat. No. 8,143,079. That patent describes use of a white light emission device that has a cascade configuration of luminescent silicon nanoparticle films to convert the output of a UV/blue light LED into white light output. Red, green and blue films are stacked on the UV/blue light LED. These films allow the blue light of the LED to pass through, but absorb the UV light. The absorbed UV light produces respective red, green and blue fluorescence from the cascaded nanoparticle films. The device produces wide spectrum white light.

However, reliance on the blue LED pumping source presents a significant hurdle to achieving a high correlated color temperature (CCT) and color rendering index (CRI) at the same time. These are measures that help compare the quality of a white light source to natural light.

Others have proposed using high-power UV LEDs to drive white light generation. UV radiation is potentially harmful and its transmission must be limited. High power UV LEDs have to be used in a configuration that captures and converts the UV radiation. This conversion requires an efficient wide band red converter. Few good efficient red phosphors, whether sulfide-, nitride-, or oxide based have been known. Typical spectra from known converters are dominated by sharp line spectra with branching ratios that depend on the UV wavelength, which is not ideal for color mixing. The red phosphor yttrium oxide-sulfide activated with europium ($Y_2O_2S:Eu$), for example, has been investigated in UV-based lighting. Co-doped phosphate materials were recently synthesized for near UV pumping, which provided a peak wavelength of 610 nm. See, Cho et al, "Study of UV excited white light-emitting diodes for optimization of luminous efficiency and color rendering index," Phys. Status Solidi (RRL) 3, 34 (2009).

Another approach for wavelength conversion on a UV-LED based source has been (CdSe)ZnSe quantum dots to produce a hybrid red emitting LED. See, Song et al., "Red light emitting solid state hybrid quantum dot-near-UV GaN LED devices," Nanotechnology 18 255202 (2007). The (CdSe)ZnSe quantum dots were used as red phosphors and a GaN UV-LED provided excitation. This device did not provide white light emission, however, instead only providing red emissions.

Present red phosphor converters provide spectra dominated by sharp lines and suffer from availability and stability issues which are not ideal for color mixing in display or solid state lighting applications.

SUMMARY OF THE INVENTION

An embodiment of the invention is a nanophosphor containing red silicon nanoparticles dispersed in a medium with a blue phosphor and a green phosphor. The medium can be room temperature vulcanization silicone. In preferred embodiments, the silicon nanoparticles, ZnS:Ag and ZnS:Cu,Au,Al are mixed in ratios that simultaneously provide a predetermined correlated color temperature (CCT) and color rendering index (CRI). In a preferred embodiment, the emission spectra of the nanophosphor is D65 standard of solar radiation.

A method for forming a hybrid nanophospor includes pre-mixing components for a suspension medium; permitting the suspension medium to become viscous; and homogeneously and thoroughly mixing in red silicon nanoparticles, a blue phosphor and a green phosphor into the suspension medium. In preferred embodiments, silicon nanoparticles, ZnS:Ag and ZnS:Cu,Au,Al are mixed in ratios that simultaneously provide a predetermined correlated color temperature (CCT) and color rendering index (CRI).

DETAILED DESCRIPTION OF THE PREFERRED EMBODIMENTS

UV-solid state lighting that does not transmit blue spectrum from a blue LED pump could alleviate problems described in the backgrounds. Use of a UV LED is desirable if because UV LED light sources would suffer less blue shift at high driving current conditions desirable in white light sources. The invention provides UV-LED driven devices that avoid many problems associated with prior UV-LED driven lighting sources, and blue (near UV) LED driven devices that do not transmit blue spectrum from the driving LED.

An embodiment of the invention is a hybrid nanophosphor that is white-emitting in response to UV or near UV radiation. Approximate 3 nm (2.9 nm) sized red luminescent Si nanoparticles form part of a hybrid nanophosphor. The monodispersed Si nanoparticles provide red luminescence and are mixed with ZnS:Ag and ZnS:Cu,Au,Al in room temperature vulcanization silicone (RTV) for blue and green conversion. The hybrid nanophosphor provides high quality white light in response to UV stimulation. The fluorescence of the hybrid nanophosphor of the invention spans the entire visible range, with full color coverage. Excellent CCT temperature and CRI index values provided.

A preferred embodiment of the invention is white emitting LED. The white emitting LED includes a UV LED and a hybrid nanophosphor converter of the invention. The nanophosphor converter can be on the active layers of the UV LED or on the packaging. More generally, it can be positioned as any other wavelength conversion layer.

A preferred embodiment nanophosphor is 3-phase hybrid nanophosphor in RTV for UV-based white solid state LED lighting. The hybrid nanophosphor uses ZnS:Ag, and ZnS:Cu,Au,Al for blue and green conversion, respectively, and mono dispersed 3 nm Si nano particles as a red phosphor. With wide emission profiles for all components, predetermined color characteristics in terms of CCT and CRI can be achieved simultaneously for excitation. This was demonstrated in experiments in the range of 350-400 nm excitation.

Preferred embodiments of the invention will now be discussed with respect to the drawings and with respect to experimental devices. The drawings may include schematic representations, which will be understood by artisans in view of the general knowledge in the art and the description that follows. Features may be exaggerated in the drawings for emphasis, and features may not be to scale.

Experiments demonstrated that a hybrid nanophosphor of the invention provides high quality white light from UV excitation with a UV LED or a near UV LED that is in the blue spectrum. An experimental nanophosphor and UV LED were fabricated and analyzed in terms of the strength of inter-band-gap transition and continuum band to band transitions. The experimental nanophosphor include ZnS:Ag and ZnS:Cu,Au,Al for blue and green conversion, respectively, and mono dispersed 3 nm Si nano particles as a red phosphor. The nanophosphor demonstrates wide emission profiles for each spectrum component, which permits achievement of predesigned color characteristics in terms of CCT and CRI simultaneously for excitation in the range 350-400 nm.

Figure 1:
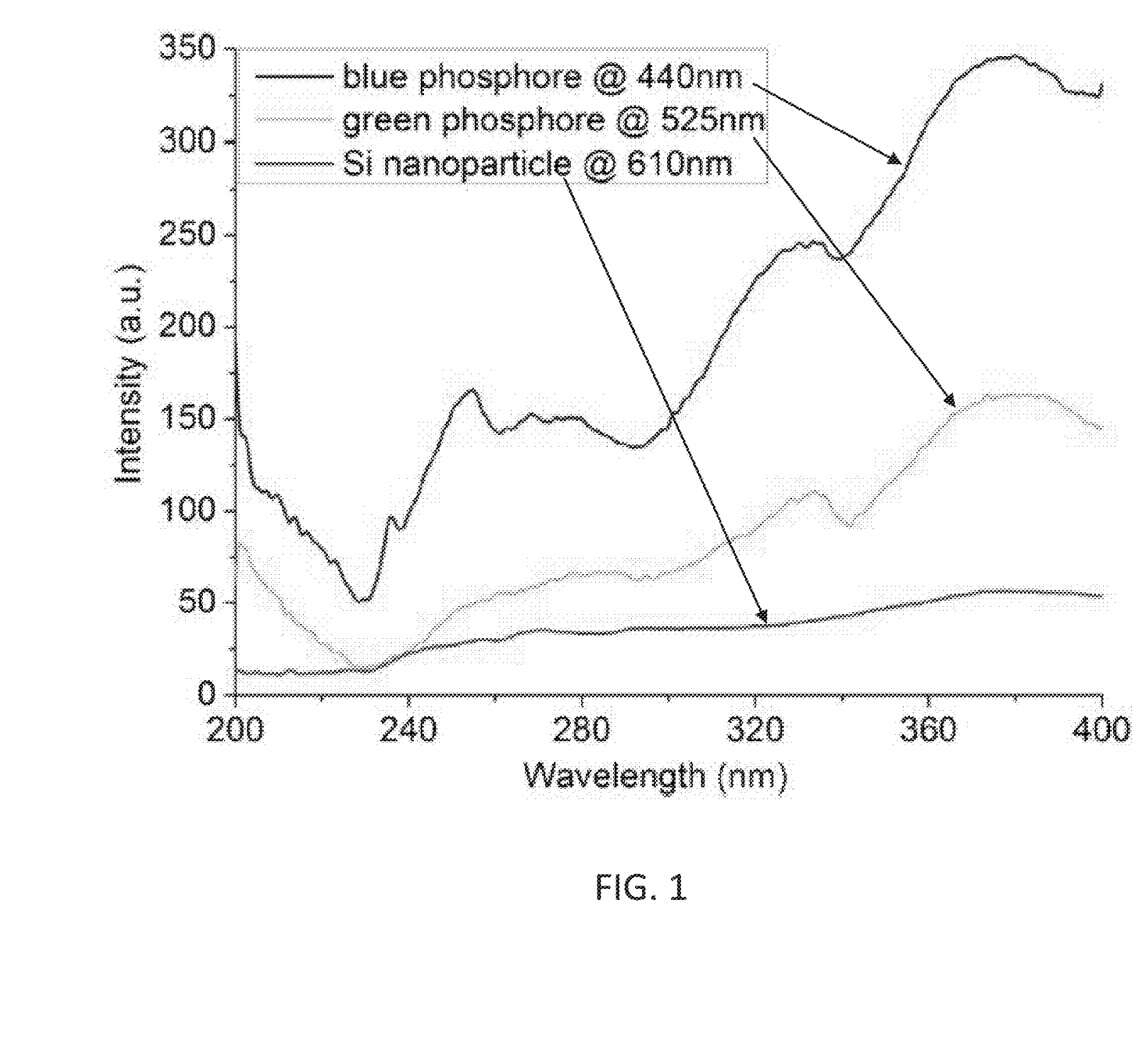
FIG. 1 shows excitation spectra of thin films of the three spectral components of a hybrid nanophosphor film according to a preferred embodiment of the invention.

The experimental nanophosphor was produced as follows. Si nanoparticles were first produced by chemical etching of boron-doped 100 Si wafers. The wafer is treated in a mixture of HF and Auric ($HAuCl_4$) acid and hexachloroplatinic ($H_2PtCl_6$—$H_2O$) acid to deposit a platinum catalyst. It is then etched using $HF/H_2O_2$/methanol mixture, followed by sonication in a liquid of choice. When examined the solution is found to be brightly red-orange luminescent under 365 nm irradiation with band head at ~610 nm Commercial green and phosphors were then prepared for combination in the nanophosphor. Colloids of ZnS:Ag and ZnS:Cu,Au,Al are luminescent under excitation with 365 nm with band heads at 440 and 525 nm, respectively. FIG. 1 shows excitation spectra of thin films of the three spectral components of a hybrid nanophosphor film. The excitation spectra are of thin films of arbitrary thickness and area of the three components blue and green phosphors and red Si nanoparticles when each is monitored at its maximum response at 440, 525, and 610 nm, respectively. Blue phosphor (top), green phosphor (middle), and red silicon nanoparticles (red curve) (bottom) are shown when each is monitored at its maximum response at 440, 525, and 610 nm, respectively. The relative signal size is not indicative of the relative efficiency.

Formation of red silicon nanoparticles is also described in Nayfeh et al. U.S. Pat. No. 7,001,578, entitled Family of Discretely Sized Silicon Nanoparticles. The processes described in the '578 patent can be used to obtain the red nanoparticles used in the present nanophosphor.

The data in FIG. 1 shows that when the wavelength of excitation at 365 nm is changed to 254 nm, the efficiency of the blue phosphor and the nanoparticles each drop to the 50% level, whereas the green phosphor efficiency drops more strongly to the 30% level.

While Si particles stay suspended in the colloid, the ZnS:Ag and ZnS:Cu,Au,Al phosphors tend to quickly precipitate. Pre-mixing of the RTV components and allowing the mixture to have a viscosity to achieve stable dispersions is used to avoid precipitation during the curing of the RTV. The phosphor components are not layered. Instead, the silicon nanoparticles, ZnS:Ag and ZnS:Cu,Au,Al phosphors are mixed thoroughly to achieve a homogeneous mixture. Although the red luminescent nanoparticles absorb at the onset of their quantum confinement band gap of 2.2 eV, i.e., in the red wing of the green of the phosphor, their strongest absorption is in the UV/blue. The CCT temperature of the white light is obtained from the spectral power density (SPD) and the standard observer's color matching functions (CMFs), and the CIE 1960 UCS Planckian locus. The CRI index is calculated and compared to that of the standard illuminant D65. The samples were examined under excitation from a near UV-blue LED at 390 nm, and 365 nm and 254 nm from a mercury lamp.

Figure 2:
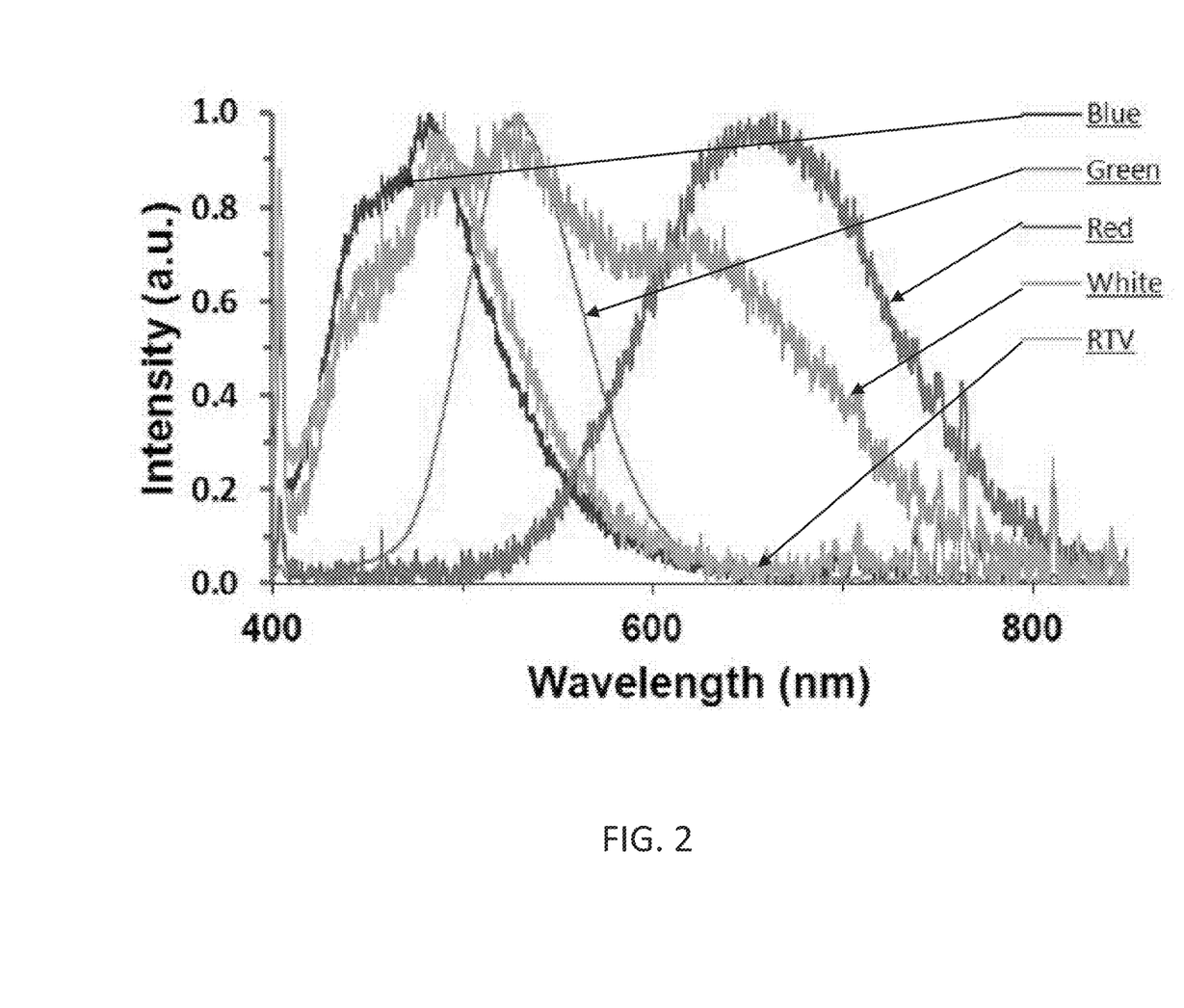
FIG. 2 provides the normalized spectra taken under 365 nm of ZnS:Ag, ZnS:Cu,Au,Al and red nanoparticles individually dispersed in RTV along with the spectrum of white emitting combined nanophosphor.

FIG. 2 provides the normalized spectra taken under 365 nm of ZnS:Ag, ZnS:Cu,Au,Al and red nanoparticles individually dispersed in RTV. FIG. 2 shows that the individual components provide blue (410-550 nm), green (470-600 nm), and red (550-800 nm) bands, respectively. FIG. 2 also provides the normalized spectrum of a mixture of the three components, which forms the spectrum of a nanophosphor in accordance with an embodiment of the invention. The nanophosphor mixture shows a broad spectrum covering the entire range of the visible from 400 to 800 nm. FIG. 2 also provides the normalized spectrum of pure RTV as a reference. It is observed to be weakly fluorescent in the blue part of the spectrum in the range 420-550 nm.

Observation of the individual components in RTV showed the components to provide separate blue, green and red emissions. The luminescence from the RTV-nanophosphor mixture was observed to be bright white. When the individual components or mixture are inspected, emission is found to be isotropic. This indicates homogeneous mixing with no segregation. Color balancing can be provided by varying the relative volumes of the individual components.

Figure 3A:
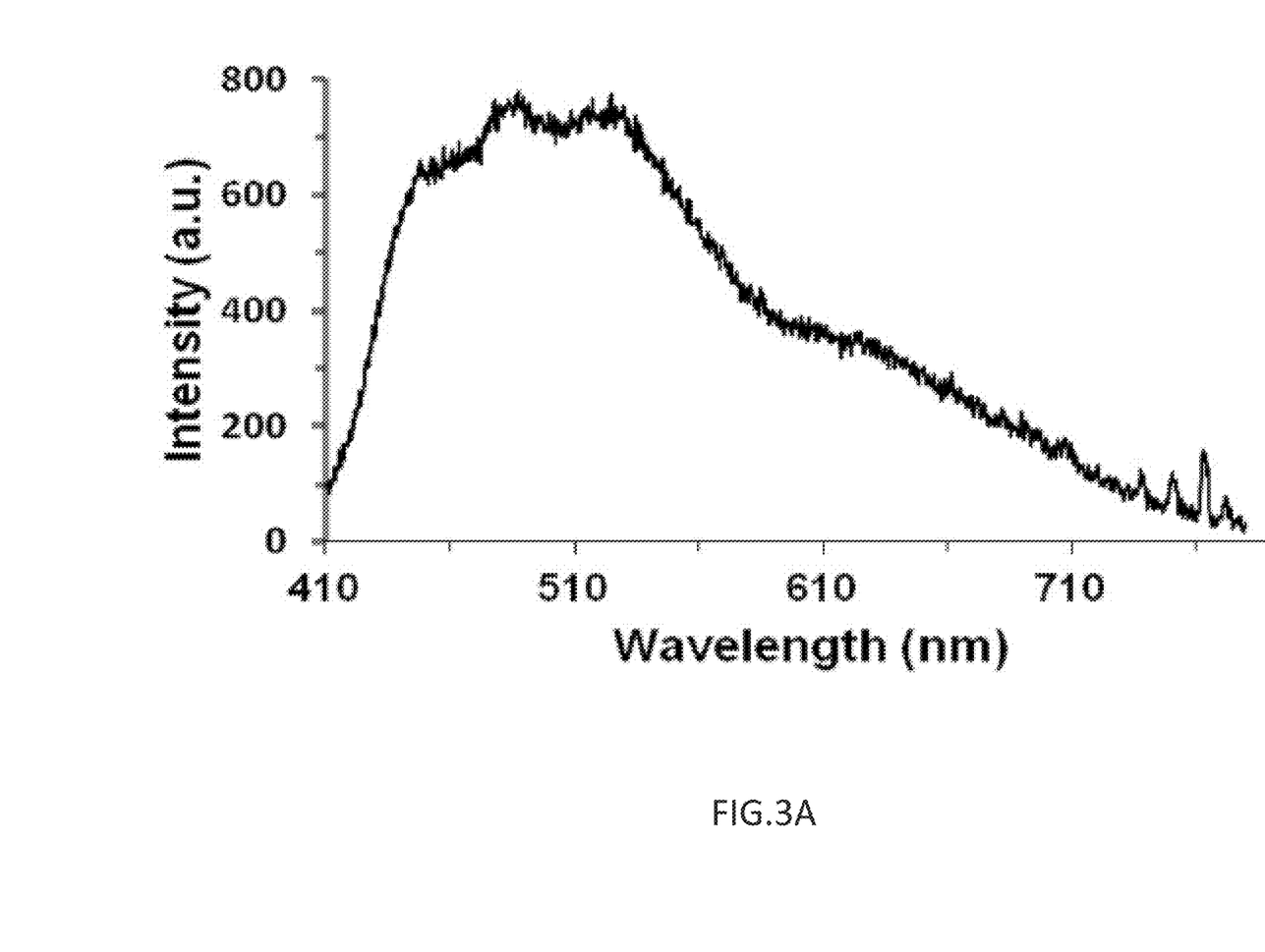
FIGS. 3A-3C provide spectra of three samples of different composition ratios giving white light in hybrid nanophosphor mixtures of preferred embodiments of the invention.
Figure 3B:
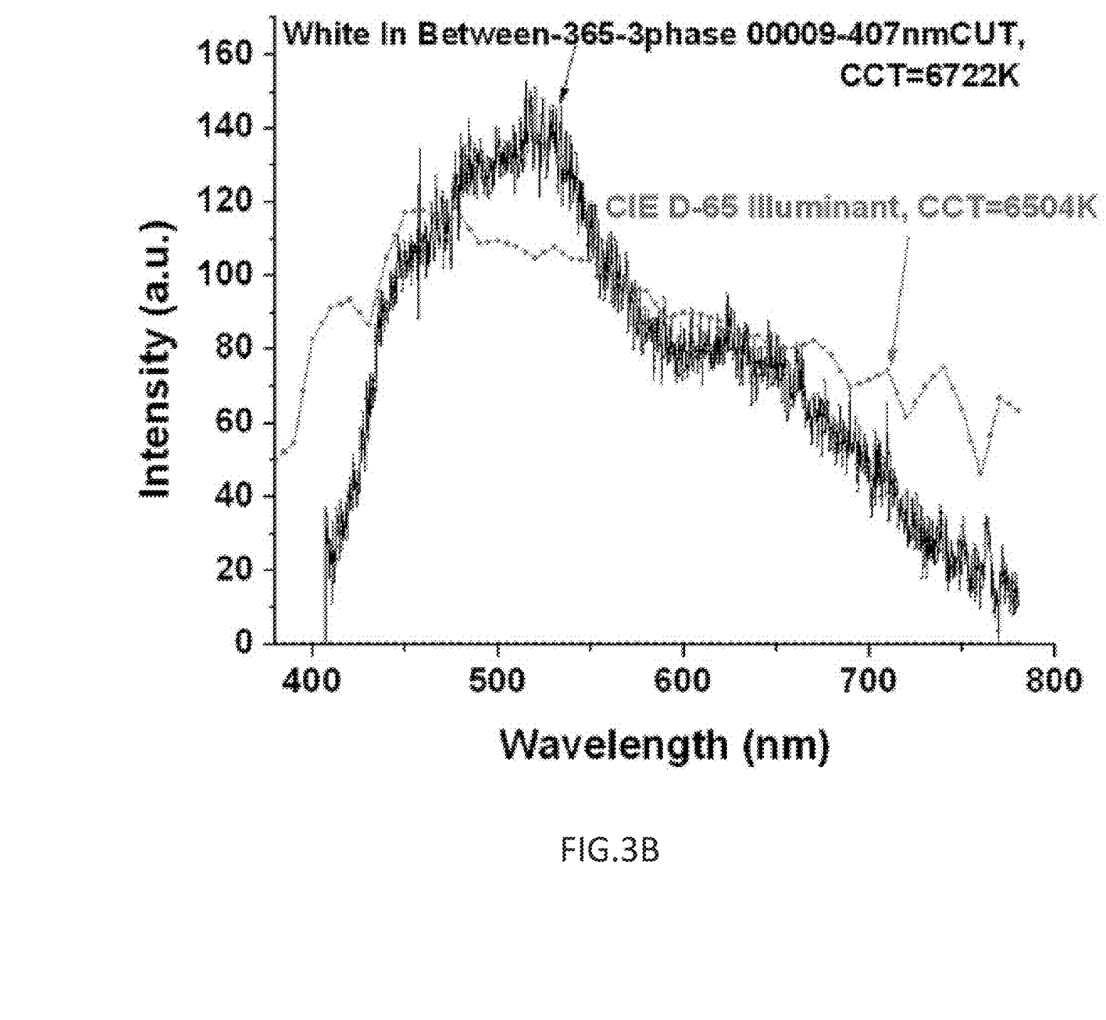
Figure 3C:
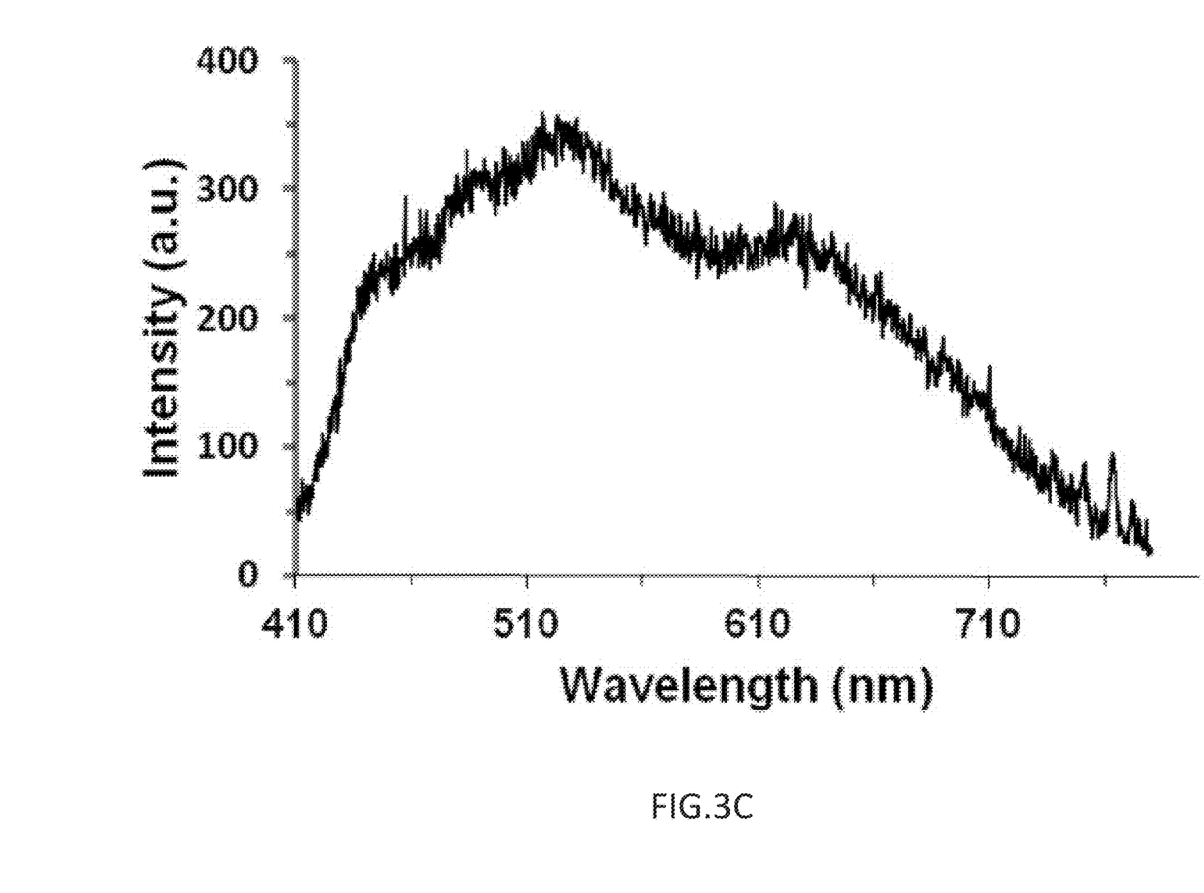

An experiment began with the blue and green phosphors and nanoparticle red phosphor in unknown concentrations, but having a recorded optical response. From this, required volumes were chosen iteratively to arrive at certain color mixtures as shown in FIGS. 3A-3C, which provides spectra of three samples of different composition ratios giving white light. Specifically, FIGS. 3A to 3C show Luminescence spectra of three shades of white light using different branching ratios of the individual component blue and green phosphors and red Si nanoparticles. The spectra were analyzed for CCT (FIG. 3A) 7981 K; (FIG. 3B) 6722 K; and (FIG. 3C) 5560 K. FIG. 3B also shows the spectrum of the CIE standard illuminant D65 standard of solar radiation.

Figure 4:
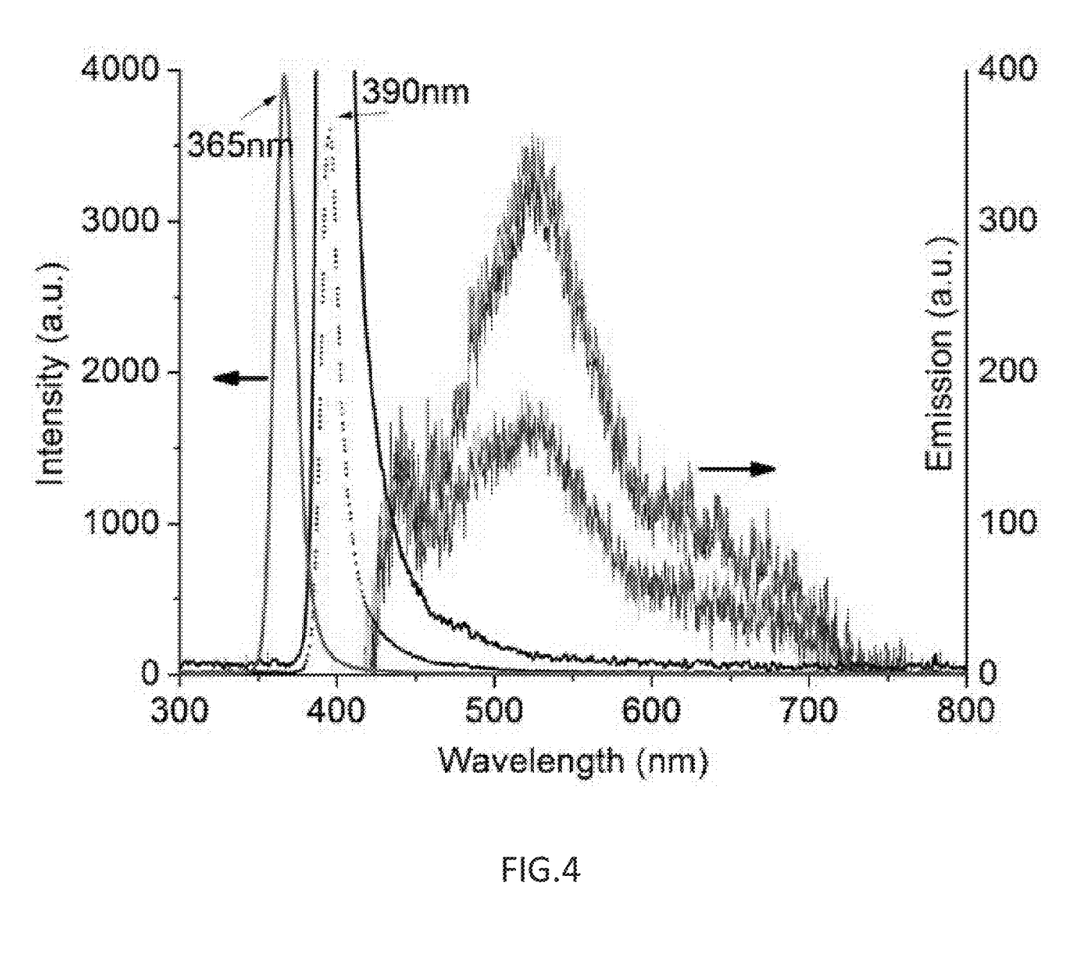
FIG. 4 shows the spectra of experimental white hybrid nanophosphor samples excited using commercial UV LEDs at 390 nm and 365 nm.

The experimental iterative procedure proved reasonably effective to optimize ratios to match required CCT and CRI values. White samples were examined with excitation using commercial UV LEDs at 390 nm and 365 nm, whose spectra are shown in FIG. 4. FIG. 4 also provides spectra of two white samples using the commercial UV LED at 390 nm. The 390 nm LED may have a small tail background in the blue.

The CCT temperature of the white samples is obtained from the SPD using three standard known steps. First, calculate the inner product of the SPD with the standard observer's CMFs. The fitting of the CIE standard observer's color matching function is shown in FIG. 3A using the interpolation.

This yielded the tristimulus values (X, Y, Z)=(80.0, 100.0, 104.9) (after normalizing for Y=100). Using these values, the xy chromaticity values were calculated to be x=0.2809, y=0.3510. These chromaticities were converted to the CIE 1960 UCS u and v coordinates: u=0.1690, v=0.3167, which according to CIE 1960 UCS gives 7981K on the Planckian locus, which has a co-ordinate of (0.2809, 0.3510). This temperature significantly higher than 6504 K, which is the CCT of D-65 illuminant, the CIE standard for daylight. Similar calculations gave CCTs of 6722 K and 5560 K for the two other spectra of FIGS. 3B and 3C. The FIG. 3B example is closer to the 6504 K standard. Experiments shows that adjustment of the ratios of the components in RTV can be used to achieve a desired color temperature and also to match the solar spectrum better.

A procedure to control and optimize the nanocomposition calculates the CRI index relative to that of the solar standard spectrum. FIG. 3B also provides the spectrum of the CIE standard illuminant D65 standard of solar radiation. The comparison shows that the example nanophosphor spectrum has more green and less deep red and deep blue. Calculations show a CRI of 10.2. The spectra in FIG. 3A and FIG. 3C matches the shape of the solar standard spectrum better, giving CRI of 30 and 55.

Figure 5:
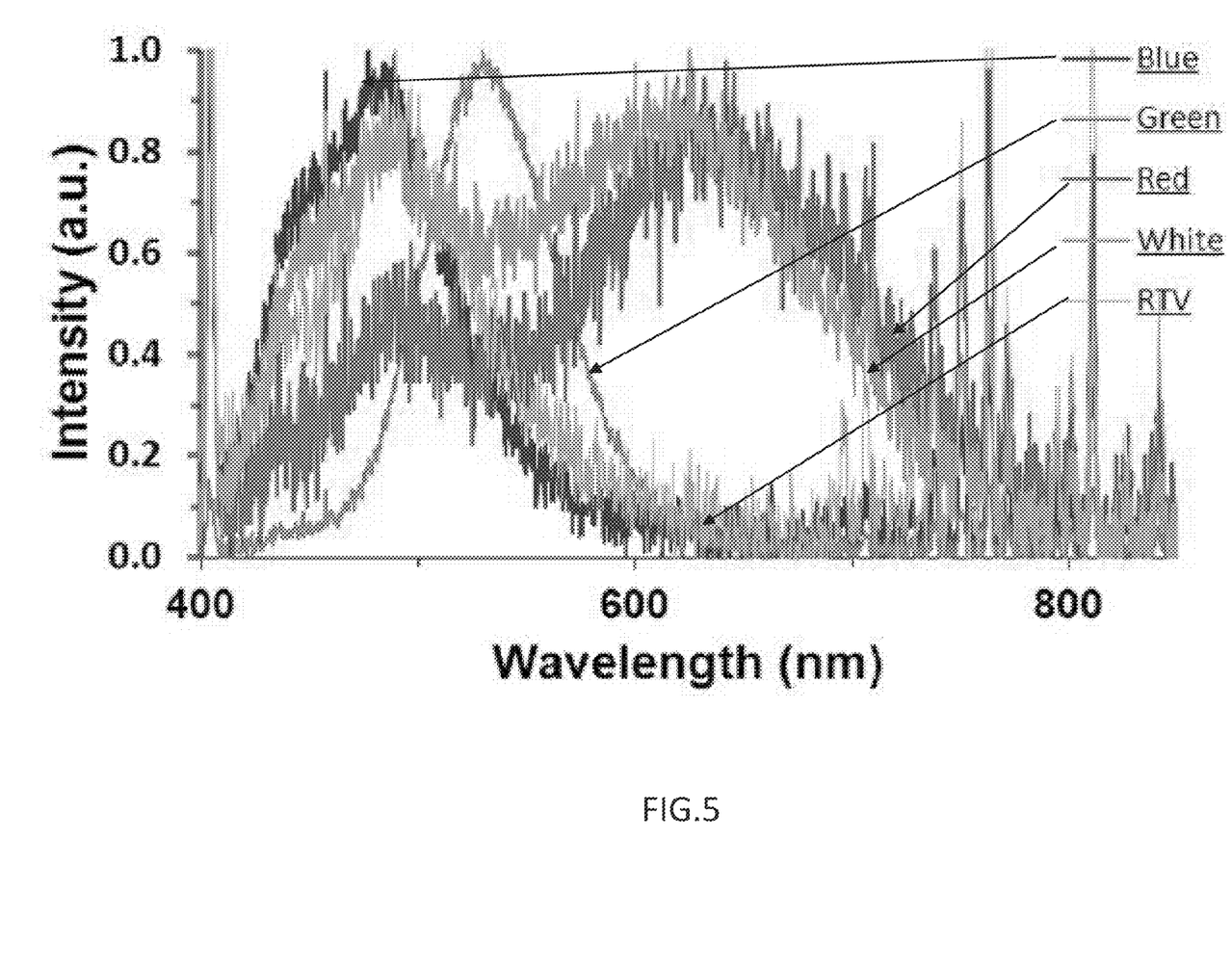
FIG. 5 provides the normalized spectra of the FIG. 2 samples taken under 254 nm.

The sample studied in FIG. 2 was also examined under 254 nm. The spectra are shown in FIG. 5. The spectra include the normalized emission spectra of ZnS:Ag (blue), ZnS:Cu,Au,Al (green), and Si nanoparticles (red) individually dispersed in RTV under the excitation of 254 nm radiation. Also shown is the spectrum is due to a mixture of the three components dispersed in RTV under excitation of 254 nm and the normalized spectrum of pure RTV as a reference. The spectral distributions of the individual green and blue components remain the same compared to pumping at 365 nm as in FIG. 2, but the nanoparticles show an additional weak blue-green component resulting from some oxygen termination, which supplements the blue-green phosphor components. The quantum efficiency of the components, however, changes as was seen in the excitation curves in FIG. 1. Whereas the efficiencies of the red at 610 nm and blue at 440 nm components dropped in proportion, the green efficiency at 525 nm dropped significantly relative to the drop in the blue and red.

Figure 6A:
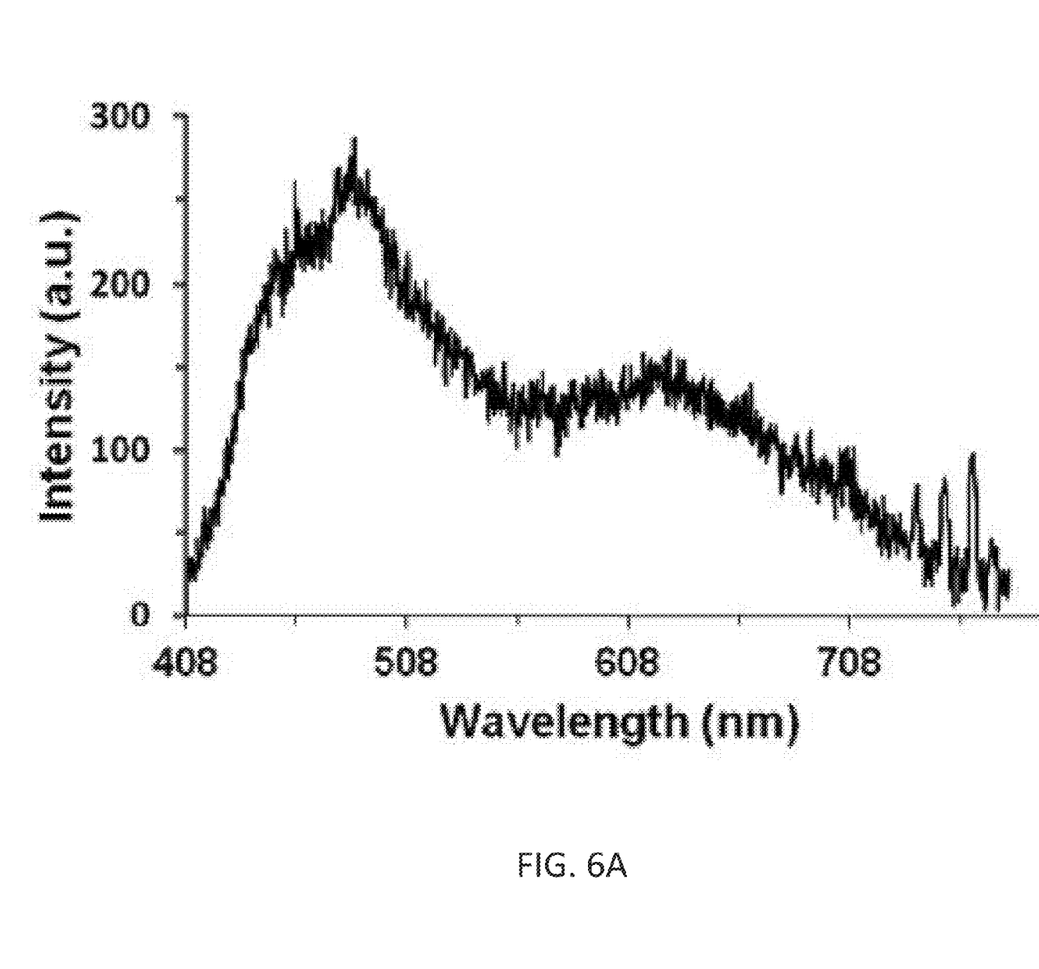
FIGS. 6A and 6B shows the samples of FIGS. 3A and 3B under excitation at 254 nm.
Figure 6B:
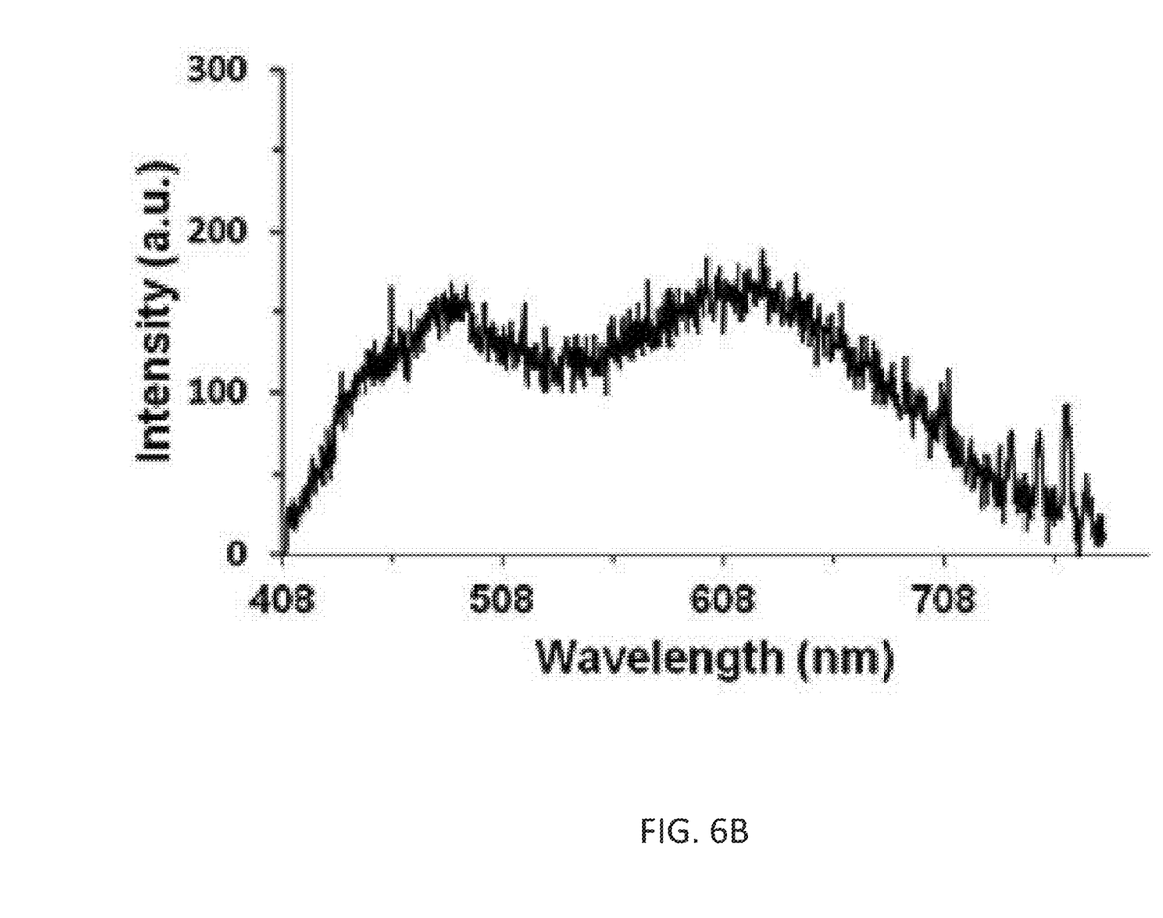

FIGS. 6A and 6B show how the spectra of the samples in FIG. 3A and FIG. 3B, respectively, transform under excitation at 254 nm. Analysis for the top and bottom spectra gives 7764 K and 4385 K for excitation at 254 nm the CCT compared to 7981 K and 5560 K, respectively, for excitation at 365 nm.

The corresponding CRI was calculated to be 83 and 50, respectively, with the improvement attributed to the decrease of the green efficiency. This demonstrates the ability to optimize the ratios of the three components to achieve a desired CCT temperature and CRI.

The stability of the CCT temperature of a hybrid nanophosphor of the invention was also examined under UV radiation in an experimental white light emitting LED of the invention. The hybrid nanophosphor was formed by spin coating phosphors and nanoparticles on a glass substrate. The nanophosphor was excited with a Nichia UV LED at 371 nm. Under LED irradiation, variations are quite slow and weak. To accelerate the study, an intense continuous wave UV laser beam from a HeCd laser at 330 nm. The 20 mW output was focused to a 3 mm spot at the sample.

Figure 7A:
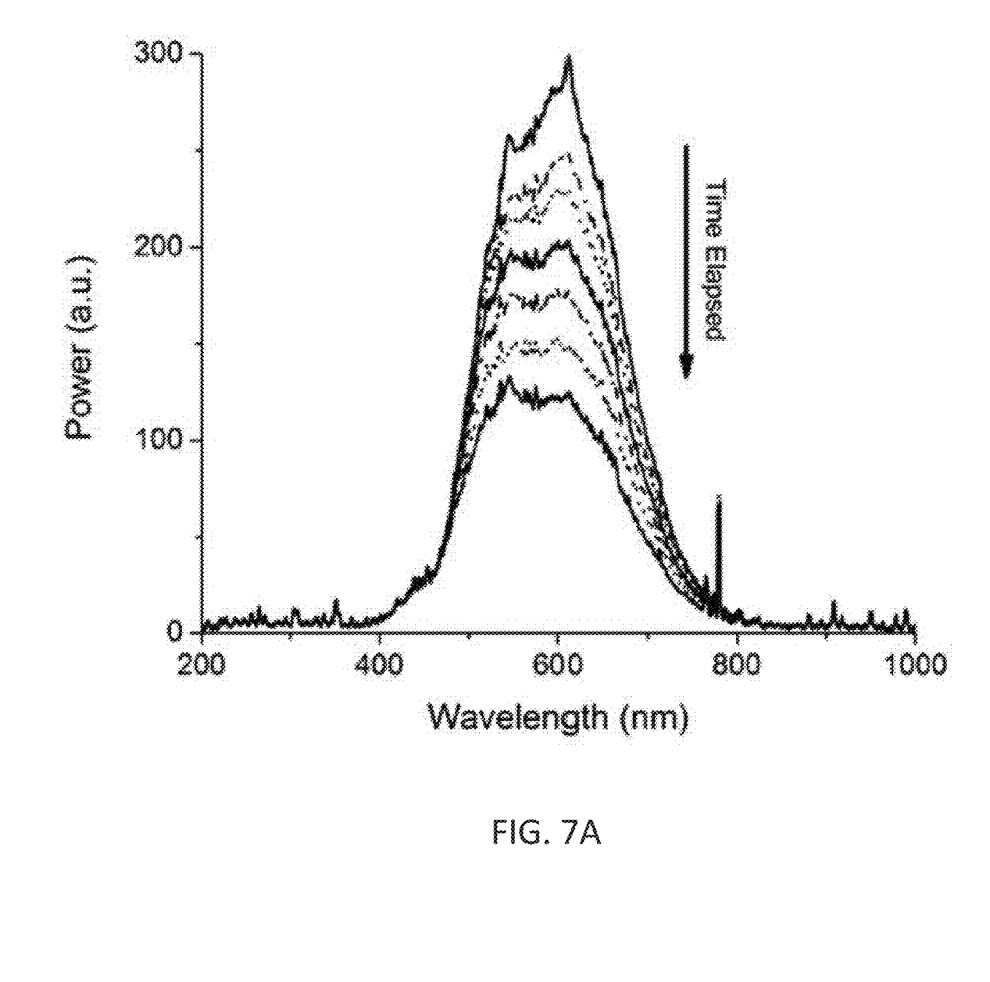
FIGS. 7A and 7B show spectra over time from stability testing of hybrid nanophosphor thin film of the invention including green phosphor and red nanoparticles while being subjected to an intense continuous wave UV laser beam from a HeCd laser at 330 nm.
Figure 7B:
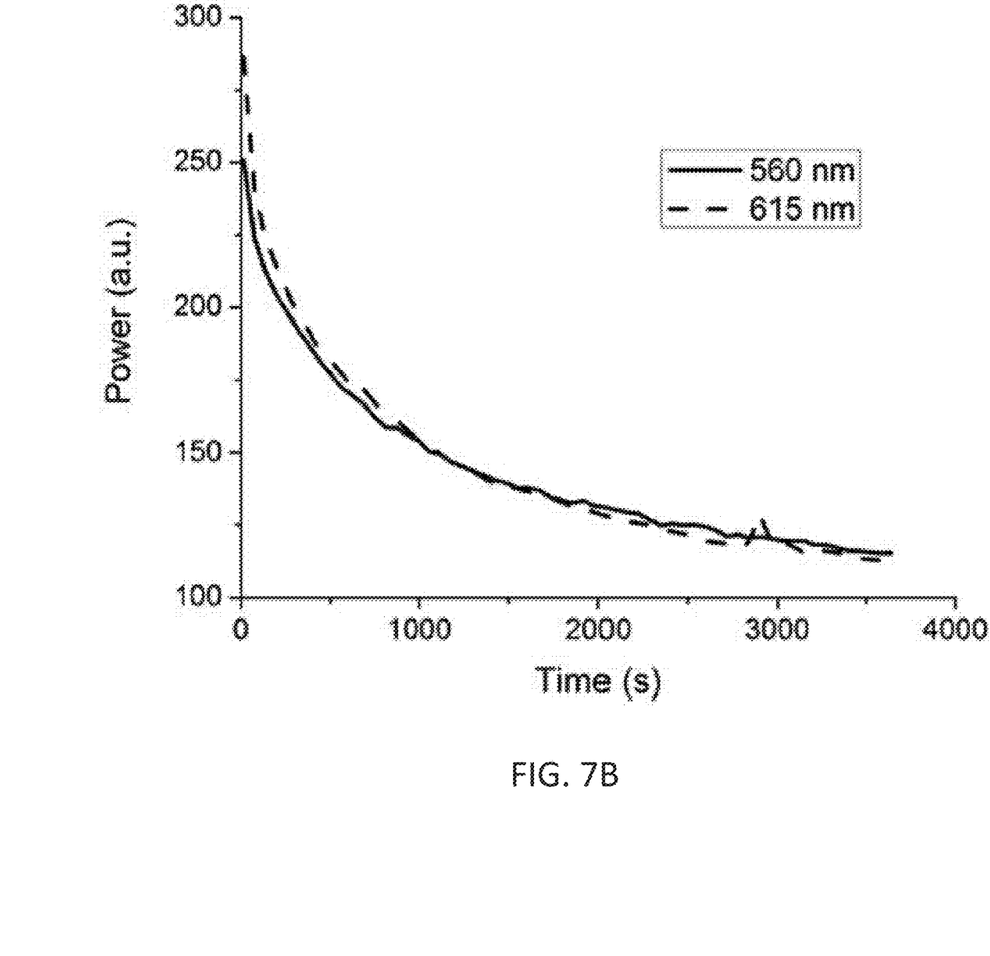

FIG. 7A displays the time development of the spectrum of a mixture of green phosphor (ZnS:Cu,Au,Al) and red nanoparticles under continuous irradiation. FIG. 7B gives the time development at the head of the green phosphor and nanoparticle bands. Initially, over the first 15 min, the luminescence of both the phosphor and the nanoparticles drop strongly, with the particle luminescence dropping more rapidly than that of the green phosphor. Beyond this point, the two become much more stable and track each other quite well. These transient differences into account when targeting certain CCTs and CRIs for a particular hybrid nanophosphor of the invention. The profile of the drop in the luminescence is not due to the degradation of the RTV matrix as this kind of profile drop has also been observed when nanoparticles are in a colloid of isopropyl alcohol. The phenomenon takes place in fresh samples.

Figure 8:
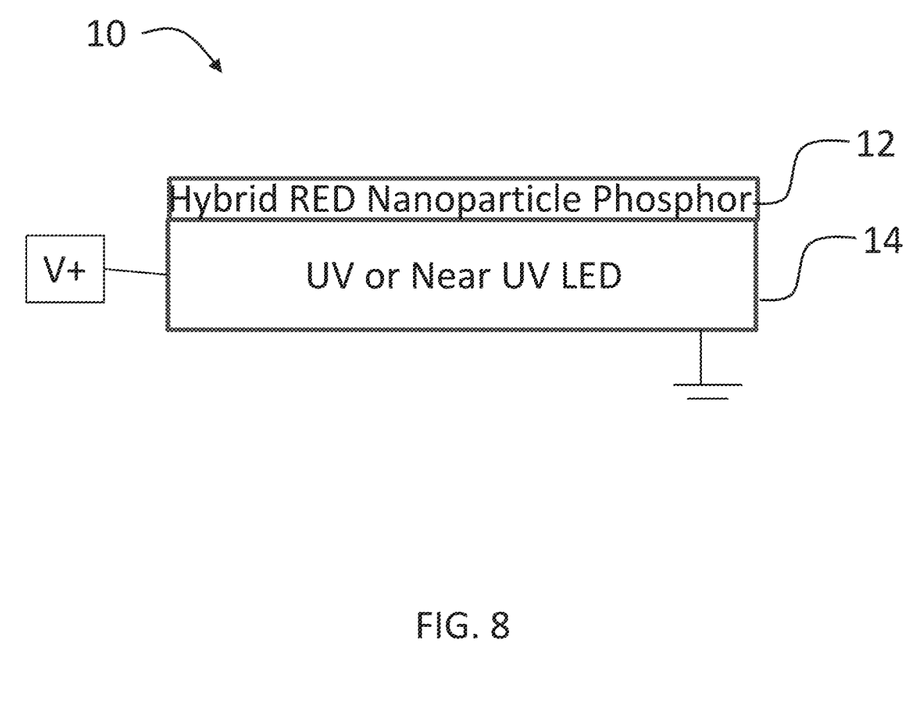
FIG. 8 is a schematic diagram of a preferred embodiment white emitting LED of the invention.

FIG. 8 illustrates a preferred LED. A white emitting LED device 10 includes a thin nanophosphor 12 upon a UV or near UV emitting LED 14.

The variation of the white light characteristics can be considered as a function of the excitation wavelength. In general, due to the Stoke shift, the energy loss increases as the excitation wavelength decreases. Using shorter wavelength excitation can modulate the CRI and CCT but may cause a decrease in the efficiency at the same times. In principle, the optimization of the nanophosphor composition would be done at the excitation wavelength of the pumping UV, which is preferably chosen close to the emission wavelength. The variation in the color temperature for UV excitation at the shorter 254 nm wavelength observed can be explained in terms of the nature of the states involved. In the green phosphor, the host ZnS is prepared under an excess of sulfide ion ($S^{2-}$) concentration to remove sulfur traps. The state of the dopant $Al^{3+}$ substitutional of Zn (Alzn) traps electrons from photoexcited electron-hole pairs to form a donor state, which lies below the conduction band edge, and from which emission proceeds. On the other hand the state of the dopant $Cu^+$ substitutional of $Zn^{2+}$ (CuZn) traps holes to form an accepter state that lies above the valence band edge, which constitutes the ground state. Thus, excitation proceeds more efficiently via inter-band-gap states. For the blue phosphor, ZnS is prepared under a deficiency of sulfide ion ($S^{2-}$) concentration. The excited state is a sulfur vacancy state ($V_S$), which traps electrons to form shallow donor levels just below the conduction band edge. Similar to the green case, $Cu^+$ substitutionally situated at a $Zn^{2+}$ site (CuZn) forms an accepter ground level. Vs lies above $Alz_n$, much closer to the edge of the conduction band. Thus, in the blue phosphor, excitation proceeds more efficiently via valence band to conduction band transitions of the ZnS host crystal. For the nanoparticle, excitation proceeds more efficiently via valence band to conduction band transitions of Si, followed by electron relaxation and trapping into high quantum efficiency emitting state within the band gap of the particle. Due to the discrete nature of the states, the inter-band-gap transition is sensitive to wavelength, and drops as the photon energy increases in the UV. On the other hand, due to the continuum nature of the band to band transitions, excitation in the blue phosphor and in the particles is less sensitive to wavelength as the photon energy increases. The fact that the measured spectral distribution of the blue and red bands stays the same is consistent with this analysis. The variation in the excitation efficiencies with wavelength results in the change of the intensities, hence temperature. The emerging blue-green component in the silicon nanoparticle luminescence makes their spectrum wider, allowing better tuning to the solar spectrum, hence better CRI.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A nanophosphor comprising red silicon nanoparticles dispersed in a medium with a blue phosphor comprising ZnS: Ag and a green phosphor comprising ZnS: Cu, Au, Al;
    wherein the suspension medium comprises room temperature vulcanization silicone.

2. A method for forming a hybrid nanophospor, comprising:
    pre-mixing components for a suspension medium;
    permitting the suspension medium to become viscous; and
    homogeneously and thoroughly mixing in red silicon nanoparticles, a blue phosphor comprising ZnS: Ag and a green phosphor comprising ZnS: Cu, Au, Al into the suspension medium;
    wherein the suspension medium comprises room temperature vulcanization silicone.

* * * * *